United States Patent
Nohara et al.

(10) Patent No.: US 12,275,831 B2
(45) Date of Patent: Apr. 15, 2025

(54) METHOD FOR PRODUCING POLYPROPYLENE-BASED RESIN EXPANDED BEADS AND POLYPROPYLENE-BASED RESIN EXPANDED BEADS

(71) Applicant: JSP CORPORATION, Tokyo (JP)

(72) Inventors: Tokunobu Nohara, Tokyo (JP); Yasutaka Ode, Utsunomiya (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 18/278,660

(22) PCT Filed: Dec. 21, 2021

(86) PCT No.: PCT/JP2021/047422
§ 371 (c)(1),
(2) Date: Aug. 24, 2023

(87) PCT Pub. No.: WO2022/190564
PCT Pub. Date: Sep. 15, 2022

(65) Prior Publication Data
US 2024/0309165 A1   Sep. 19, 2024

(30) Foreign Application Priority Data
Mar. 12, 2021   (JP) ................. 2021-040841

(51) Int. Cl.
*C08J 9/18*   (2006.01)
*C08J 3/12*   (2006.01)
(Continued)

(52) U.S. Cl.
CPC ............... *C08J 9/18* (2013.01); *C08J 3/126* (2013.01); *C08J 9/122* (2013.01); *C08J 9/232* (2013.01);
(Continued)

(58) Field of Classification Search
CPC ...... C08J 9/18; C08J 3/126; C08J 9/122; C08J 9/232; C08J 2203/22; C08J 2323/16; C08K 3/04; C08K 5/17
See application file for complete search history.

(56) References Cited

U.S. PATENT DOCUMENTS

2004/0171708 A1   9/2004   Yoshizawa et al.
2009/0169895 A1*  7/2009   Nohara .............. C08J 9/0061
                                                   428/407
(Continued)

FOREIGN PATENT DOCUMENTS

JP    2004-263033 A    9/2004
JP    2009-298892 A    12/2009
(Continued)

OTHER PUBLICATIONS

Mar. 1, 2022 International Search Report issued in International Patent Application No. PCT/JP2021/047422.
(Continued)

*Primary Examiner* — K. Boyle
(74) *Attorney, Agent, or Firm* — Oliff PLC

(57) ABSTRACT

A method for producing polypropylene-based resin expanded beads includes dispersion, blowing agent impregnation, and foaming steps. Beads used in the dispersion step include a core layer having a polypropylene-based resin as a base material resin, and a fusion-bonding layer covering core layer; the beads fusion-bonding layer includes carbon black and a NOR-type hindered amine; a carbon black blending ratio is adjusted to 0.5 wt % or more and 5 wt % or less; and an amine blending ratio of the beads is adjusted to 0.03 wt % or more and 0.5 wt % or less; the polypropylene-based resin expanded beads have a surface on which a fusion-bonding layer is located; the fusion-bonding layer includes the carbon black and hindered amine; a carbon (Continued)

black blending ratio is 0.5 wt % or more and 5 wt % or less; and a blending ratio of the hindered amine is 0.03 wt % or more and 0.5 wt % or less.

6 Claims, 2 Drawing Sheets

(51) Int. Cl.
*C08J 9/12* (2006.01)
*C08J 9/232* (2006.01)
*C08K 3/04* (2006.01)
*C08K 5/17* (2006.01)
(52) U.S. Cl.
CPC .................. *C08K 3/04* (2013.01); *C08K 5/17* (2013.01); *C08J 2203/22* (2013.01); *C08J 2323/16* (2013.01)

(56) References Cited

U.S. PATENT DOCUMENTS

| | | |
|---|---|---|
| 2012/0037837 A1 | 2/2012 | Itoi |
| 2014/0346411 A1 | 11/2014 | Miura et al. |
| 2015/0158990 A1 | 6/2015 | Takagi et al. |
| 2016/0137805 A1 | 5/2016 | Miura |
| 2016/0333161 A1 | 11/2016 | Ono et al. |
| 2017/0204240 A1 | 7/2017 | Van Ravestyn et al. |
| 2018/0022886 A1 | 1/2018 | Oikawa et al. |
| 2023/0203263 A1 | 6/2023 | Sakamura et al. |

FOREIGN PATENT DOCUMENTS

| | | | |
|---|---|---|---|
| JP | 2018162370 A | * | 10/2018 |
| JP | 6757871 B1 | | 9/2020 |
| KR | 10-2015-0068295 A | | 6/2015 |
| WO | 2010/119670 A1 | | 10/2010 |
| WO | 2013/094529 A1 | | 6/2013 |
| WO | 2014/203876 A1 | | 12/2014 |
| WO | 2015/107847 A1 | | 7/2015 |
| WO | 2016/052739 A1 | | 4/2016 |
| WO | 2016/111017 A1 | | 7/2016 |
| WO | 2020/189389 A1 | | 9/2020 |

OTHER PUBLICATIONS

Mar. 1, 2022 Written Opinion issued in International Patent Application No. PCT/JP2021/047422.
Jul. 19, 2024 Office Action issued in Korean Patent Application No. 10-2023-7030035.
Oct. 8, 2024 Office Action issued in Brazilian Patent Application No. 112023016054-5.
Dec. 2, 2024 Extended Search Report issued in European Patent Application No. 21930409.4.

* cited by examiner

[Fig. 1]
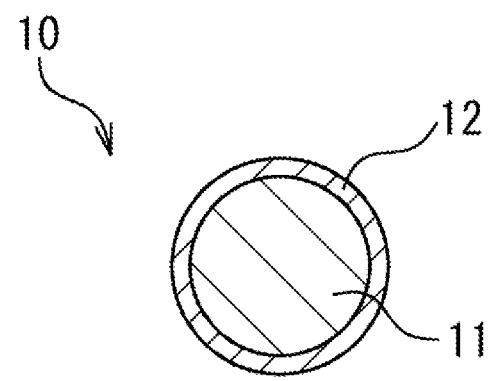
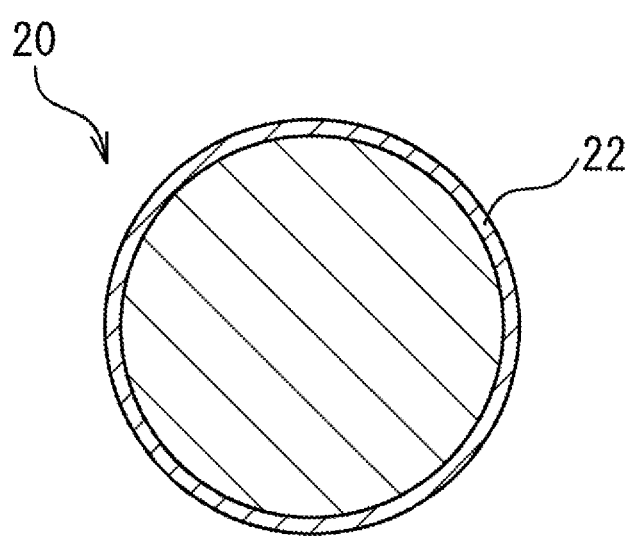

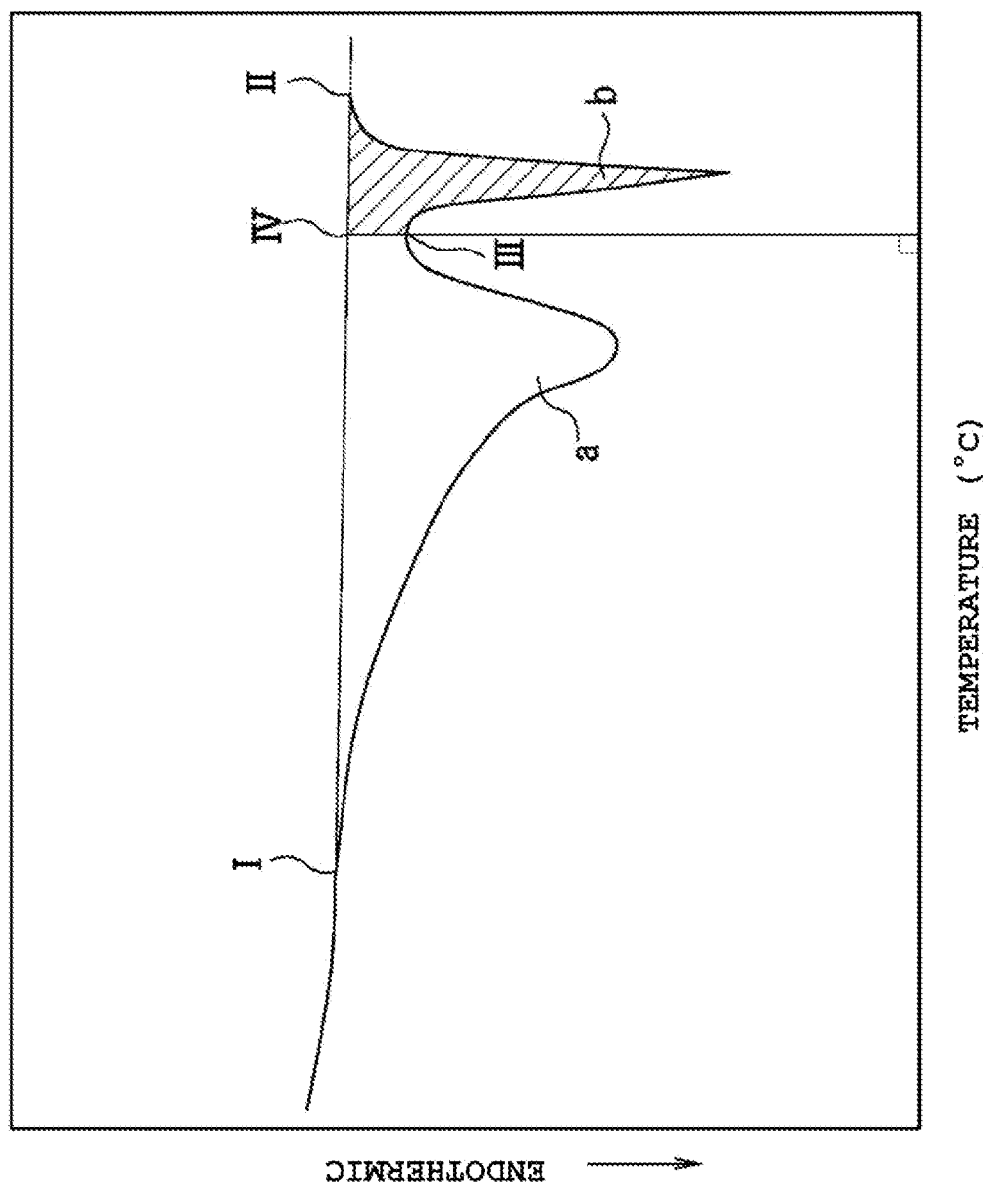

METHOD FOR PRODUCING POLYPROPYLENE-BASED RESIN EXPANDED BEADS AND POLYPROPYLENE-BASED RESIN EXPANDED BEADS

TECHNICAL FIELD

The present invention relates to a method for producing polypropylene-based resin expanded beads and polypropylene-based resin expanded beads.

BACKGROUND ART

A molded article of polypropylene-based resin expanded beads obtained by in-mold molding of the polypropylene-based resin expanded beads is used for various applications such as packaging materials, automobile members, and building materials. The expanded beads constituting such expanded bead molded article are produced, for example, as follows.

First, the polypropylene-based resin beads are dispersed in an aqueous medium including an inorganic dispersant in a vessel. Next, the above polypropylene-based resin beads are impregnated with a blowing agent in the vessel. Next, the resin beads including the blowing agent (expandable resin beads) are released from the vessel together with the aqueous medium and foamed. In this way, the polypropylene-based resin expanded beads are produced.

In the expanded beads produced as described above, a fusion-bonding layer for enhancing fusion-bonding characteristics between the expanded beads during the in-mold molding may be formed on a surface of the expanded beads (e.g., refer to Patent Literature 1). The expanded beads having a fusion-bonding layer are obtained by preparing polypropylene-based resin beads having a core layer and a fusion-bonding layer provided on a surface of the core layer, and foaming the polypropylene-based resin beads. At this time, as the fusion-bonding layer, for example, a crystalline polyolefin-based resin having a melting point lower than the melting point of the polypropylene-based resin constituting the core layer, or an amorphous polyolefin-based resin having a softening point lower than the melting point of the polypropylene-based resin constituting the core layer is used.

CITATION LIST

Patent Literature

Patent Literature 1: Patent Number JP 6757871 B

SUMMARY OF INVENTION

Technical Problem

As described above, the expanded beads having the fusion-bonding layer improves the fusion-bonding characteristics between the expanded beads during the in-mold molding, but it can be further improved in the following points.

In other words, in the polypropylene-based resin beads including a fusion-bonding layer comprising a resin composition or the like having a relatively low melting point or low softening point with respect to that of the core layer, the expanded beads may be likely to adhere to each other (blocking) depending on the foaming conditions during the foaming step. More specifically, in the foaming step of releasing the expandable resin beads impregnated with the blowing agent together with an aqueous medium from a pressure vessel or the like to an environment with a relatively low pressure to foam the expandable resin beads, the expanded beads may block (coalesce) each other. Hereinafter, such a problem regarding occurrence of blocking is also simply referred to as a "blocking problem". When the in-mold molding is performed by using the expanded beads with the blocking problem, surface properties of the expanded beads molded article to be obtained may be deteriorated.

Further, as another problem, when the expanded beads molded article is produced for a long period of time through the in-mold molding by using the expanded beads having a fusion-bonding layer, stains derived from the expanded beads may be accumulated on parts of a mold or the like to be easily heated depending on the shape of the mold or the like. Hereinafter, such a problem regarding occurrence of the accumulation of stains on the mold is also simply referred to as an "accumulation problem of stains". The accumulation problem of stains may deteriorate the surface properties of the produced expanded beads molded article.

The present invention has been made in view of such a background, and provides a method for producing polypropylene-based resin expanded beads and the polypropylene-based resin expanded beads that are capable of suppressing occurrence of a blocking problem and an accumulation problem of stains while maintaining good fusion-bonding characteristics between the expanded beads during the in-mold molding.

Solution to Problem

A method of producing polypropylene-based resin expanded beads according to the present invention is a method for producing polypropylene-based resin expanded beads, including a dispersion step of dispersing the polypropylene-based resin beads in an aqueous medium including an inorganic dispersant in a vessel; a blowing agent impregnation step of impregnating the polypropylene-based resin beads with a blowing agent in the vessel; and a foaming step of releasing the polypropylene-based resin beads including the blowing agent from the vessel together with the aqueous medium to foam the polypropylene-based resin beads, in which the polypropylene-based resin beads include a core layer having a polypropylene-based resin as a base material resin and a fusion-bonding layer covering the core layer, the fusion-bonding layer of the polypropylene-based resin beads include carbon black and an NOR type hindered amine, a blending ratio of the carbon black in the fusion-bonding layer of the polypropylene-based resin beads is 0.5 wt % or more and 5 wt % or less, and a blending ratio of the NOR type hindered amine in the fusion-bonding layer of the polypropylene-based resin beads is 0.03 wt % or more and 0.5 wt % or less.

Further, the polypropylene-based resin expanded beads of the present invention are polypropylene-based resin expanded beads having a surface on which a fusion-bonding layer is located, wherein the fusion-bonding layer includes carbon black and an NOR type hindered amine, a blending ratio of the carbon black in the fusion-bonding layer is 0.5 wt % or more and 5 wt % or less, and a blending ratio of the hindered amine in the fusion-bonding layer is 0.03 wt % or more and 0.5 wt % or less.

Advantageous Effects of Invention

In the method for producing polypropylene-based resin expanded beads of the present invention, polypropylene-based resin beads having the fusion-bonding layer including the carbon black and the NOR type hindered amine in a predetermined range are used. In this way, the present invention can produce polypropylene-based resin expanded beads capable of suppressing occurrence of the blocking problem and the accumulation problem of stains while maintaining good fusion-bonding characteristics between the expanded beads during the in-mold molding. The polypropylene-based resin expanded beads produced in the production method of the present invention can stably produce an expanded beads molded article excellent in surface properties as a result of exhibiting the aforementioned effects. Further, the polypropylene-based resin expanded beads produced in the production method of the present invention make it possible to produce the expanded beads molded article for a long period of time.

Further, since the polypropylene-based resin expanded beads of the present invention have a fusion-bonding layer including the carbon black and the NOR type hindered amine in a predetermined range, the polypropylene-based resin expanded beads are hardly affected by the blocking problem in the foaming step during production. Further, the polypropylene-based resin expanded beads of the present invention can suppress the occurrence of the accumulation problem of stains on the mold during the in-mold molding because of having such the fusion-bonding layer, and the expanded beads can be well fused to one another. Therefore, providing the polypropylene-based resin expanded beads of the present invention to the in-mold molding making it possible to provide an expanded beads molded article excellent in surface properties.

BRIEF DESCRIPTION OF DRAWINGS

FIG. 1 is an explanatory view for explaining a part of a production method according to an embodiment of the production method of the present invention.

FIG. 2 is a DSC curve obtained according to a method of measuring transition heat of plastic described in JIS K7122: 1987 for obtaining a total heat of fusion and a high-temperature peak heat of fusion of expanded beads in an example.

DESCRIPTION OF EMBODIMENTS

Hereinafter, the method for producing the polypropylene-based resin expanded beads of the present invention and the polypropylene-based resin expanded beads of the present invention will be described in order. Note that the method for producing the polypropylene-based resin expanded beads of the present invention may be simply referred to as the production method of the present invention below.

[Method for Producing Polypropylene-Based Resin Expanded Beads]

The production method of the present invention uses polypropylene-based resin beads having a core layer including a polypropylene-based resin as a base material resin and a fusion-bonding layer that covers the core layer. The fusion-bonding layer provided on such polypropylene-based resin beads includes carbon black and an NOR type hindered amine at a blending ratio in a predetermined range. Specifically, in the production method of the present invention, the blending ratio of the carbon black in the above fusion-bonding layer is 0.5 wt % or more and 5 wt % or less, and the blending ratio of the NOR type hindered amine in the above fusion-bonding layer is 0.03 wt % or more and 0.5 wt % or less.

In the production method of the present invention, a dispersion step, a blowing agent impregnation step, and a foaming step are performed by using the polypropylene-based resin beads having the fusion-bonding layer described above.

The above dispersion step is a step of dispersing the polypropylene-based resin beads in an aqueous medium including an inorganic dispersant in a vessel. The above blowing agent impregnation step is a step of impregnating the polypropylene-based resin beads with a blowing agent in the vessel. The above foaming step is a step of releasing the polypropylene-based resin beads including the blowing agent (expandable resin beads) from the vessel together with the aqueous medium to foam the polypropylene-based resin beads.

The production method of the present invention can be appropriately added with an optional step in addition to these steps within a range not departing from the scope of the invention.

Incidentally, in general, in a case of producing the expanded beads by releasing the expandable resin beads impregnated with the blowing agent from the vessel together with the aqueous medium and foaming the expandable resin beads, contents in the vessel are heated to soften the expandable resin beads in order to foam the expandable resin beads to obtain a desired expansion ratio. In addition, the inorganic dispersant is usually added to the aqueous medium such that the expanded beads do not block (coalesce) each other during the foaming. However, the fusion-bonding layer in the expandable resin beads having the core layer and the fusion-bonding layer is more likely to progress softening than the core layer through the heating described above. Therefore, even when the inorganic dispersant is added, the blocking problem still easily occurs during the foaming. In particular, when the expanded beads having a high expansion ratio are intended to be obtained, the blocking problem tends to easily occur.

When the in-mold molding is performed by using the expanded beads having such blocking problem, filling property of the expanded beads into the mold is deteriorated. As a result, for example, voids and dents are formed on a surface of the expanded beads molded article to be obtained, and the surface properties of the molded article may be deteriorated. In order to suppress the occurrence of such blocking problem, increasing the amount of the inorganic dispersant added to the aqueous medium is also taken into consideration. However, in this case, productivity in the foaming step may be deteriorated; for example, treatment of the aqueous medium including the inorganic dispersant becomes complicated after the foaming step. Further, the fusion-bonding characteristics between the expanded beads during the in-mold molding may be greatly deteriorated.

In addition to the blocking problem described above, in the expanded beads having the fusion-bonding layer, the fusion-bonding layer generally tends to easily adhere to the mold during the in-mold molding. In other words, in a case where the expanded beads having the fusion-bonding layer are used, the accumulation problem of stains easily occurs. In particular, depending on, for example, the shape of the mold, molding-portions dependable heating unevenness may occur, which may form a portion that is easily heated in the mold during the in-mold molding. In this case, when the in-mold molding is performed by using the expanded beads having the fusion-bonding layer, contamination of the mold due to an adhesion of the fusion-bonding layer is more remarkable. The influence of stains accumulated in the mold, for example, may form voids and depressions on the surface of the expanded beads molded article to be obtained, and the surface properties of the molded article may be deteriorated.

Note that, for example, cleaning the mold every about 10 to 30 cycles of the in-mold molding can suppress the accumulation problem of stains as described above, depending on, for example, the shape of the mold and the molding conditions. However, when frequency of cleaning the mold is increased, the productivity is deteriorated, and thus the frequency of cleaning the mold is preferably low.

As described above, the fusion-bonding layer covering the core layer for improving the fusion-bonding characteristics between the expanded beads during the in-mold molding is a factor of causing the blocking problem and the accumulation problem of stains. Improvement of the fusion-bonding characteristics between the expanded beads during the in-mold molding and improvement of the blocking problem and the accumulation problem of stains are generally contradictory matters. Conventionally, it is difficult to simultaneously achieve both improvements.

However, according to the production method of the present invention having the configuration described above, it is possible to produce the polypropylene-based resin expanded beads capable of simultaneously solving these problems. Further, the polypropylene-based resin expanded beads produced in the production method of the present invention can suppress the occurrence of the accumulation problem of stains even in a case where the expanded beads molded article is molded through the in-mold molding for a long period of time without frequently cleaning the mold as done in the conventional case.

With the above-described excellent effects exhibited, the polypropylene-based resin expanded beads produced in the production method of the present invention can make it possible to provide an expanded beads molded article excellent in surface properties.

Hereinafter, the production method of the present invention will be described in more detail. FIG. 1 is appropriately used in the description. FIG. 1 is an explanatory view for explaining a part of a production method according to an embodiment of the production method of the present invention.

As illustrated in an upper part of FIG. 1, the production method of the present invention is a method for producing polypropylene-based resin expanded beads 20 (hereinafter, also referred to as resin beads 20) illustrated in a lower part of FIG. 1 by using polypropylene-based resin beads 10 (hereinafter, also referred to as resin beads 10) having a core layer 11 and a fusion-bonding layer 12 covering the core layer 11 to perform a predetermined step. The expanded beads 20 have a surface on which a fusion-bonding layer 22 is located. The fusion-bonding layer 22 is a layer derived from the fusion-bonding layer 12 provided on a surface of the core layer 11.

Note that FIG. 1 is a conceptual diagram illustrated to facilitate understanding of the production method of the present invention, and does not limit, for example, bead diameters of the resin beads 10 and the expanded beads 20, and thickness ratios of the fusion-bonding layer 12 of the resin beads 10 and the fusion-bonding layer 22 of the expanded beads 20. Further, the resin beads 10 and the expanded beads 20 illustrated in FIG. 1 are illustrated in a cut section passing through substantially the center of the bead, but these beads may be in a spherical shape or any shape such as a cylindrical shape.

Note that the fusion-bonding layer 12 provided on the surface of the core layer 11 becomes the fusion-bonding layer 22 provided on the surfaces of the expanded beads 20 by foaming the resin beads. Therefore, the fusion-bonding layer 12 can also be referred to as a prefusion-bonding layer with respect to the fusion-bonding layer 22.

(Polypropylene-Based Resin Beads)

The resin beads 10 used in the production method of the present invention includes the core layer 11 and the fusion-bonding layer 12 that is provided on the surface of the core layer 11 and covers the core layer 11. The expanded beads 20 obtained by foaming the resin beads 10 including the fusion-bonding layer 12 has a surface on which the fusion-bonding layer 22 is located, so that the fusion-bonding characteristics between the expanded beads 20 during the in-mold molding can be enhanced.

<Core Layer>

The core layer 11 is made of a base material resin including a polypropylene-based resin as a main component. Note that in the present description, the main component of the base material resin refers to a component in the base material resin which has a weight ratio of 50 wt % or more.

Examples of the polypropylene-based resin as a main component of the base material resin include a propylene homopolymer or a polypropylene-based copolymer including a propylene-derived structural unit in an amount of more than 50 wt %.

Examples of the above polypropylene homopolymer include propylene homopolymers such as isotactic polypropylene, syndiotactic polypropylene, and atactic polypropylene.

Further, examples of the above polypropylene-based copolymer include a copolymer of propylene and ethylene or α-olefin having four or more carbon atoms, such as a propylene-ethylene copolymer, a propylene-butene copolymer, and a propylene-ethylene-butene copolymer, a propylene-acrylic acid copolymer, and a propylene-maleic anhydride copolymer. Note that these copolymers may be any of a block copolymer, a random copolymer, and a graft copolymer. Further, the polymer described above may be crosslinked, but is preferably non-crosslinked.

From a viewpoint of enhancing rigidity, heat resistance or the like of the expanded beads molded article to be obtained by the in-mold molding of the expanded beads, a melting point of the above polypropylene-based resin is preferably 135° C. or higher, more preferably 138° C. or higher, and still more preferably 140° C. or higher. Further, from a viewpoint of enhancing in-mold molding property of the expanded beads at a relatively low molding pressure, the melting point of the above polypropylene-based resin is preferably 160° C. or lower, more preferably 155° C. or lower, and still more preferably 150° C. or lower.

The melting point of the polypropylene-based resin can be determined based on JIS K7121:1987. At this time, "(2) a case where a melting temperature is measured after constant heat treatment" is adopted to adjust states of a test piece.

More specifically, a peak top temperature of a melting peak determined by the DSC curve obtained when using the polypropylene-based resin or the expanded beads as the test piece, the test piece is heated from 23° C. to 200° C. at a heating rate of 10° C./min, then lowered to 23° C. at a cooling rate of 10° C./min, and heated again from 23° C. to 200° C. at heating rate of 10° C./min based on a heat-flux differential scanning calorimetry described in JIS K7121: 1987 is defined as the melting point of the polypropylene-based resin.

Note that in a case where two or more of the melting peaks appear in the DSC curve, the temperature at the top of the melting peak having the largest area is taken as the melting point. At this time, it is possible to determine the melting peak having the largest area by distinguishing each melting peak based on a boundary temperature between valleys of the DSC curve positioned between the peak top temperatures of the respective melting peaks, and comparing the areas (heat of fusion) respectively. The temperature between the valleys of the DSC curve can be determined from a temperature at which a value of a vertical axis of a differential curve (DDSC) is 0 with reference to the differential curve of the DSC.

The base material resin constituting the core layer 11 may include other resins and other polymers such as an elastomer in addition to the polypropylene-based resin without departing from the scope of the invention.

Examples of the other polymers include one or two or more of mixed materials selected from thermoplastic resins other than the polypropylene-based resins such as polyethylene-based resins, polystyrene-based resins, polyamide-based resins, and polyester-based resins, as well as elastomers such as olefin-based thermoplastic elastomers and styrene-based thermoplastic elastomers.

A ratio of the polypropylene-based resin in the base material resin is 50 wt % or more, preferably 70 wt % or more, more preferably 80 wt % or more, still more preferably 90 wt % or more, and particularly preferably 100 wt %.

The core layer 11 may appropriately include an optional additive. Examples of the optional additive include a flame retardant, a flame retardant auxiliary, a cell controlling agent, a lubricant, a crystal nucleating agent, a colorant, a conductive material, and an antistatic agent. Further, at least one of the carbon black and the NOR type hindered amine is preferably included in the core layer 11, and the carbon black and the NOR type hindered amine are preferably included in the core layer 11. With an appropriate amount of the carbon black being included in the core layer 11, a black expanded beads 20 can be provided. Further, with an appropriate amount of the NOR type hindered amine being included in the core layer 11, the expanded beads 20 excellent in flame retardancy can be provided. As the carbon black and the NOR type hindered amine blended in the core layer 11, the carbon black and the NOR type hindered amine exemplified in the description of the fusion-bonding layer 12 described later may be suitably used.

From a viewpoint of imparting a good black appearance to the expanded beads molded article in-mold molded by using the expanded beads 20, the blending ratio of the carbon black in the resin beads 10 is preferably 0.5 wt % or more, more preferably 1.0 wt % or more, still more preferably 1.5 wt % or more, and particularly preferably 2.0 wt % or more.

However, from a viewpoint that the flame retardancy of the expanded beads molded article in-mold molded by using the expanded beads 20 is not impaired, the blending ratio of the carbon black in the resin beads 10 is preferably 5.0 wt % or less, more preferably 4.0 wt % or less, still more preferably 3.5 wt % or less, and particularly preferably 3.0 wt % or less.

From a viewpoint that the flame retardancy of the expanded beads molded article to be obtained is hardly impaired even when carbon black is included, the blending ratio of the NOR type hindered amine in the resin beads 10 is preferably 0.03 wt % or more, more preferably 0.05 wt % or more, and still more preferably 0.06 wt % or more.

However, from a viewpoint of easily suppressing variation in a cell diameter of the expanded beads molded article to be obtained and easily obtaining an expanded beads molded article excellent in appearance characteristics such as color tone, the blending ratio of the NOR type hindered amine in the resin beads 10 is preferably 0.4 wt % or less, more preferably 0.3 wt % or less, and still more preferably 0.2 wt % or less.

When the NOR type hindered amine is blended in the core layer 11, a molecular weight of the NOR type hindered amine included in the core layer 11 is approximately 300 or more and 3000 or less, preferably 400 or more and 1500 or less, more preferably 500 or more and 1200 or less, and still more preferably 600 or more and 900 or less. With the use of the NOR type hindered amine having a molecular weight within the above-described range in the core layer 11, the flame retardancy may be stably imparted to the expanded beads molded article to be obtained even in a case where a bulk density of the expanded beads 20 is low or the expanded beads 20 includes the carbon black. Further, as long as the molecular weight is in the above range, occurrence of unevenness in color tone of the expanded beads molded article obtained can be suppressed even in a case where the expanded beads 20 to be obtained from the resin beads 10 including a colorant such as the carbon black is used in the core layer 11. Note that reasons why these effects are exhibited are not clear, but the following is considered. The NOR type hindered amine having a molecular weight in the above range is easily mixed with the base material resin constituting the core layer 11, and is not easily aggregated in the base material resin. Therefore, an aggregate of the NOR type hindered amine is not easily generated in the base resin, and formation of cell nuclei derived from the aggregate is suppressed. In this way, it is considered that the variation in the cell diameter in the expanded beads is further reduced, and a cell film thickness of the molded article to be obtained tends to be uniform.

From such a viewpoint, a ratio of the NOR type hindered amine having the above molecular weight in the NOR type hindered amine is preferably 50 wt % or more, more preferably 80 wt % or more, and still more preferably 90 wt % or more.

<Fusion-Bonding Layer>

The fusion-bonding layer 12 is a layer that covers a part or all of the surface of the core layer 11 of the resin beads 10.

The fusion-bonding layer 12 refers to a layer that enables the in-mold molding of the expanded beads molded article equivalent to a favorable single-layer expanded beads molded article at a steam pressure lower than the lowest steam pressure at which an expanded beads molded article (also referred to as a favorable single-layer expanded beads molded article) in which single-layer expanded beads are favorably fused is obtained in a case where the single-layer expanded beads are in-mold molded. Here, the single-layer expanded beads refer to expanded beads formed by foaming single-layer resin beads composed of only the core layer of the resin beads used for obtaining the expanded beads 20 of the present invention. Note that the single-layer expanded beads used in molding the above favorable single-layer expanded beads molded article and the expanded beads (the expanded beads 20 of the present invention) used in molding an expanded beads molded article equivalent to the above favorable single-layer expanded beads molded article are equivalent in physical properties such as the expansion ratio and the diameter of the expanded beads, and correspond to each other except for the presence or absence of the fusion-bonding layer 12.

For example, as the base material resin constituting the fusion-bonding layer 12, a resin showing a melting point or a softening point lower than the melting point of the base material resin constituting the core layer 11 is used. The expanded beads 20 formed by using the resin beads 10 having such a fusion-bonding layer 12 has, on the surface thereof, the fusion-bonding layer 22 resulting from the fusion-bonding layer 12 provided on the surface of the core layer 11.

In the present invention, the fusion-bonding layer 12 is preferably composed of a resin composition including the base material resin, the carbon black, and the NOR type hindered amine.

The fusion-bonding layer 12 may be present on the entire surface of the resin beads 10 or may be present on a part of the surface as long as the intended matters of the present invention can be achieved. Examples of typical resin beads 10 include ones in a cylindrical shape or in a substantially spherical shape.

From a viewpoint of enhancing the in-mold molding property of the expanded beads 20, a ratio of the fusion-bonding layer 12 to a total weight of the resin beads 10 is preferably 0.5 wt % or more, more preferably 1 wt % or more, and still more preferably 2 wt % or more. Further, from a viewpoint of enhancing the mechanical strength of the expanded beads molded article obtained by the in-mold molding, the ratio of the fusion-bonding layer 12 to the total weight of the resin beads 10 is preferably 10 wt % or less, more preferably 8 wt % or less, and still more preferably 6 wt % or less.

When the ratio of the weight of the fusion-bonding layer 12 to the total weight of the resin beads 10 is in the above range, the expanded beads excellent in fusion-bonding characteristics may be obtained without impairing the physical properties of the expanded beads 20 produced by using the resin beads, and the problems that are intended to be solved by the present invention can be solved. In other words, the expected physical properties of the expanded beads molded article formed by the in-mold molding of the expanded beads produced by using the resin beads of only the core layer 11 without the fusion-bonding layer 12 can also be sufficiently exhibited in the expanded beads molded article formed by the in-mold molding of the expanded beads 20 produced by using the resin beads 10 having the fusion-bonding layer 12 in the above proportion.

Base Material Resin:

Examples of the main component of the base material resin constituting the fusion-bonding layer 12 include a crystalline polyolefin-based resin having a melting point lower than the melting point of the polypropylene-based resin constituting the core layer 11, an amorphous polyolefin-based resin having a softening point lower than the melting point of the polypropylene-based resin constituting the core layer 11, and an adhesive resin such as a urethane resin.

In a case where the main component of the base material resin of the fusion-bonding layer 12 is the polyolefin-based resin, from a viewpoint of easily suppressing the adhesion of the fusion-bonding layer to the mold, a difference between the melting point of the polypropylene-based resin constituting the core layer 11 and the melting point of the polyolefin-based resin constituting the fusion-bonding layer 12 is preferably 30° C. or less, more preferably 25° C. or less, and still more preferably 20° C. or less. However, from a viewpoint of enhancing the fusion-bonding characteristics between the expanded beads and further enhancing the in-mold molding property under low molding pressure conditions, the difference between the melting point of the polypropylene-based resin constituting the core layer 11 and the melting point of the polyolefin-based resin constituting the fusion-bonding layer 12 is preferably 3° C. or higher, more preferably 5° C. or higher, and still more preferably 8° C. or higher.

Further, the melting point of the above polyolefin-based resin is preferably 100° C. or higher and 150° C. or lower, more preferably 110° C. or higher and 140° C. or lower, and still more preferably 120° C. or higher and 135° C. or lower.

Note that the melting point of the polyolefin-based resin constituting the fusion-bonding layer 12 can be determined based on JIS K7121:1987 in the same manner as the melting point of the polypropylene-based resin constituting the core layer 11. Further, the softening point (a Vicat softening temperature) of the resin is measured based on an A50 method of JIS K7206:2016. Further, the melting point of the resin is measured based on JIS K7121:1987. As a main component of the base material resin of the fusion-bonding layer 12, the polypropylene-based resin exemplified as the base material resin constituting the core layer 11 can be preferably used. Among them, from a viewpoint of stably obtaining an expanded beads molded article excellent in mechanical strength, the main component of the base material resin of the fusion-bonding layer 12 preferably includes the polypropylene-based copolymer, and more preferably one or two or more polypropylene-based copolymers selected from the propylene-ethylene copolymer, the propylene-butene copolymer, and the propylene-ethylene-butene copolymer.

The ratio of the main component in the base material resin constituting the fusion-bonding layer 12 is 50 wt % or more, preferably 70 wt % or more, more preferably 80 wt % or more, still more preferably 90 wt % or more, and particularly preferably 100 wt %.

The fusion-bonding layer 12 may include other polymers such as other resins and elastomers within a range not departing from the scope of the invention. Examples of the above other polymers are the same as those of the other polymers in the core layer 11 described above.

Carbon Black:

In the present invention, the carbon black is included in the fusion-bonding layer 12 in order to solve the intended problems. In general, the carbon black included in the resin beads or the expanded beads is used as a colorant for giving a black color. However, according to the present invention, it has been revealed that blending the carbon black in the fusion-bonding layer 12 in an amount within a predetermined range with the NOR type hindered amine to be described later can simultaneously solve the contradictory events of the improvement of the fusion-bonding characteristics of the expanded beads molded article and the improvement of the blocking problem and the accumulation problem of stains.

As the carbon black included in the fusion-bonding layer 12, for example, channel black, roller black, furnace black, thermal black, acetylene black, ketjen black, or the like can be used. Among them, the furnace black is preferable as the carbon black used in the present invention because it is excellent in a balance between dispersibility in the polypropylene resin and material cost.

In the present invention, the blending ratio of the carbon black in the fusion-bonding layer 12 is 0.5 wt % or more and 5 wt % or less.

Even when the fusion-bonding layer includes the NOR type hindered amine to be described later in a predetermined range, there is a possibility that desirable expanded beads cannot be provided in a case where the blending ratio of the carbon black included in the fusion-bonding layer greatly deviates from the above range. In other words, in a case where the blending ratio of the carbon black in the fusion-bonding layer is too low (including a case of 0 wt %), the surface of the expanded beads is likely to adhere to the mold during the in-mold molding, and the mold may be likely to be contaminated, or the surface properties of the expanded beads molded article to be obtained may be deteriorated. On the other hand, in a case where the blending ratio of the carbon black in the fusion-bonding layer is too high, the expanded beads molded article to be obtained may become flammable.

From a viewpoint of easily suppressing the adhesion of the fusion-bonding layer 22 to the mold during the in-mold molding and easily providing the expanded beads molded article having a good appearance by suppressing the occurrence of unevenness in color tone, the blending ratio of the carbon black in the fusion-bonding layer 12 is preferably 1.0 wt % or more, more preferably 1.5 wt % or more, and still more preferably 2.0 wt % or more. However, from a viewpoint of enhancing the in-mold molding property of the expanded beads 20 and making the expanded beads molded article to be obtained less flammable, the blending ratio of the carbon black in the fusion-bonding layer 12 is preferably 4.0 wt % or less, more preferably 3.5 wt % or less, and still more preferably 3.0 wt % or less.

NOR Type Hindered Amine:

The fusion-bonding layer 12 includes the NOR type hindered amine in an amount within a predetermined range.

Specifically, the blending ratio of the NOR type hindered amine in the fusion-bonding layer 12 is 0.03 wt % or more and 0.5 wt % or less. In a case where the blending ratio of the NOR type hindered amine is largely deviated from the above range, desirable expanded beads may not be provided. In other words, in a case where the blending ratio of the NOR type hindered amine in the fusion-bonding layer is too low (including a case of 0 wt %), the expanded beads may be likely to block one another during the foaming step. On the other hand, in a case where the blending ratio of the NOR type hindered amine in the fusion-bonding layer is too high, the fusion-bonding characteristics of the expanded beads molded article obtained by the in-mold molding may be greatly deteriorated.

From a viewpoint of more efficiently suppressing a mutual blocking of the expanded beads 20 and making the expanded beads molded article to be obtained less flammable even when the carbon black is included, the blending ratio of the NOR type hindered amine in the fusion-bonding layer 12 is preferably 0.05 wt % or more, and more preferably 0.06 wt % or more. However, from a viewpoint of enhancing the in-mold molding property of the expanded beads 20, the blending ratio of the NOR type hindered amine in the fusion-bonding layer 12 is preferably 0.3 wt % or less, and more preferably 0.2 wt % or less.

In the present invention, the NOR type hindered amine is a compound having a structure of [>N—OR] such as an N-alkoxyl group. Examples of the NOR type hindered amine include a compound having at least one skeleton of the following general formula (1). An optional structure is bonded to R in the general formula (1). Examples of R in the general formula (1) include an alkyl group, a cycloalkyl group, an aralkyl group, and an aryl group. Further, examples of OR in the general formula (1) include a cyclohexyloxy group and an octyloxy group.

[Chemical Formula 1]

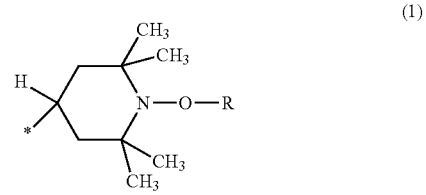

WHERE THE POSITION REPRESENTED BY * IS BONDED WITH ATOMS SUCH AS HYDROGEN ATOMS OR AN OPTIONAL STRUCTURE, AND R IS BONDED WITH AN OPTIONAL STRUCTURE.

Preferred examples of the NOR type hindered amine used in the present invention include compounds represented by the following chemical formulae (2) to (4).

The chemical formula (2) is NOR116 (trade name, with a molecular weight of 2261, manufactured by BASF SE), the chemical formula (3) is FP-T80 (trade name, with a molecular weight of 681, manufactured by ADEKA CORPORATION), and the chemical formula (4) is Tinuvin123 (trade name, with a molecular weight of 737, manufactured by BASF SE).

[Chemical Formula 2]

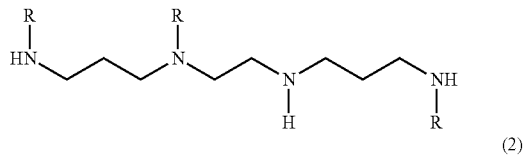

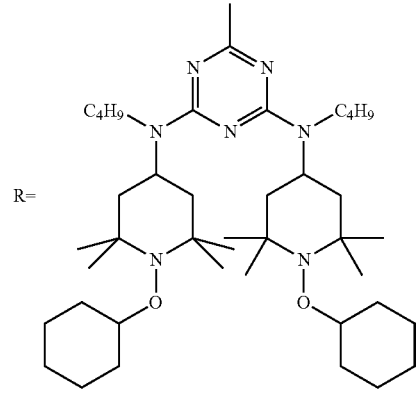

[Chemical Formula 3]

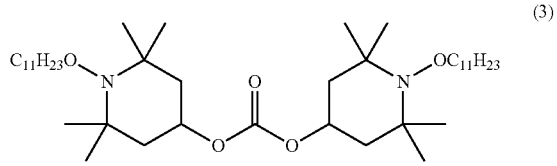

[Chemical Formula 4]

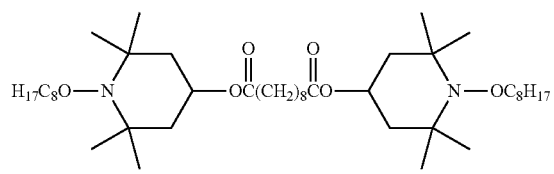

Note that the fusion-bonding layer 12 may include one NOR type hindered amine or two or more NOR type hindered amines. Further, in addition to the NOR type hindered amine, the fusion-bonding layer 12 may include another hindered amine other than the NOR type hindered amine.

In a case where another hindered amine other than the NOR type hindered amine represented by the general formula (1) is included in the fusion-bonding layer 12, the blending ratio of the other hindered amine may be adjusted within a range not departing from the scope of the invention.

As described above, in the present invention, the NOR type hindered amine is used as the hindered amine included in the fusion-bonding layer 12. This makes it possible to satisfactorily solve the blocking problem and the accumulation problem of stains, which are the intended matters of the present invention. The reason for this is not clear, but it is presumed that the NOR type hindered amine is likely to appropriately attract the inorganic dispersant in an aqueous dispersion medium, thereby producing the expanded beads having the surface appropriately attached with the inorganic dispersant.

From a viewpoint of solving the intended matters of the present invention, having excellent compatibility with the base material resin constituting the fusion-bonding layer 12, and being hardly aggregated in the base material resin, the above NOR type hindered amine preferably includes a NOR type hindered amine having a molecular weight of 300 or more and 3000 or less. In this case, the ratio of the NOR type hindered amine having the above molecular weight in the NOR type hindered amine is preferably 50 wt % or more, more preferably 80 wt % or more, and still more preferably 90 wt % or more. Further, the molecular weight of the above NOR type hindered amine is preferably 400 or more and 1500 or less, more preferably 500 or more and 1200 or less, and still more preferably 600 or more and 900 or less.

Note that the molecular weight of the NOR type hindered amine described above is the sum of atomic weight of atoms constituting the NOR type hindered amine.

The ratio of the blending ratio (wt %) of the NOR type hindered amine to the blending ratio (wt %) of the carbon black in the fusion-bonding layer 12 of the resin beads 10 described above is preferably 0.01 or more and 0.1 or less, and more preferably 0.02 or more and 0.08 or less. Adjusting the ratio of the blending ratio of the carbon black and the NOR type hindered amine in the fusion-bonding layer 12 to the range described above can more efficiently suppress the blocking problem and the accumulation problem of stains while maintaining the fusion-bonding characteristics when the expanded beads 20 is produced by using the ratio. As a result, the expanded beads 20 excellent in the in-mold molding property are easily obtained.

Other Additives:

The resin composition constituting the fusion-bonding layer 12 may include one or more other additives within a range not departing from the scope of the invention. Examples of the other additives include a flame retardant, a flame retardant auxiliary, a lubricant, a crystal nucleating agent, a conductive material, and an antistatic agent.

Granulation Method of Resin Beads:

The granulation method of the resin beads 10 is not particularly limited, but an appropriate method may be adopted as long as the configuration including the core layer 11 and the fusion-bonding layer 12 described are achieved.

Examples of the granulation method of the resin beads 10 include a method for obtaining the resin beads 10 having the fusion-bonding layer 12 laminated on the surface of the core layer 11 through co-extrusion by an extruder. The method for laminating the fusion-bonding layer 12 on the surface of the core layer 11 by the co-extrusion is preferable in that the ratio of the fusion-bonding layer 12 in the resin beads 10 can be easily adjusted, and that the fusion-bonding layer 12 having a relatively uniform thickness can be formed on the resin beads 10 with high productivity. Specifically, in the above method, first, the base material resin for forming the core layer 11 and a cell controlling agent or the like added as needed are supplied to a core layer forming extruder, and the base resin is melted and kneaded in the extruder to obtain a melt-kneaded product for forming the core layer. On the other hand, the base material resin for forming the fusion-bonding layer 12, the carbon black, and the NOR type hindered amine, etc. are supplied to a fusion-bonding layer forming extruder, and the base material resin is melted and kneaded in the extruder to obtain a melt-kneaded product for forming the fusion-bonding layer. Next, the melt-kneaded product for forming the core layer and the melt-kneaded product for forming the fusion-bonding layer are merged in a co-extrusion die provided at a downstream side of the core layer forming extruder, and the melt-kneaded product for forming the fusion-bonding layer is laminated on an outer periphery of the melt-kneaded product for forming the core layer and extruded to form a strand having a multilayer structure. Next, the strand is cut into a desired size with a pelletizer or the like to obtain the resin beads 10 having a multilayer structure. The strand is a laminate having a cross section orthogonal to an extrusion direction in, for example, a circular shape. The resin beads 10 thus obtained have, for example, a columnar shape such as a round columnar shape and have the core layer 11 at the center and the fusion-bonding layer 12 on an outer peripheral surface other than the both end surfaces. In this way, the core layer 11 may be exposed at a part of the resin beads 10.

Note that when the resin beads 10 having a multilayer structure is obtained in the above co-extrusion, for example, a type of the base material resin of the fusion-bonding layer 12, a ratio of the fusion-bonding layer 12 in the resin beads 10, extrusion conditions, and cutting conditions may be adjusted. Then, for example, by adopting a method of cutting the strand in a state where the strand is sufficiently softened, the resin beads 10 in which substantially the entire surface of the core layer 11 is covered with the fusion-bonding layer 12 can be obtained. Further, the resin beads 10 having a substantially spherical shape can be obtained by, for example, heating the resin beads 10 having a cylindrical shape in the dispersion medium at a temperature equal to or higher than the melting point of the base material resin constituting the core layer 11 for a predetermined time period and subjecting the resin beads 10 to a spheroidization treatment.

Further, examples of a different granulation method of the resin beads 10 include a method in which the core layer 11 formed in a beads form in advance and the resin composition for constituting the fusion-bonding layer 12 are mixed to form the fusion-bonding layer 12 on the surface of the core layer 11. As an example of such granulation method, first, the core layer 11 formed in the bead form is put into a mixing apparatus having a mixing function and a heating function to heat the surface layer portion of the core layer 11. Next, the resin composition for constituting the fusion-bonding layer 12 is put into the above mixing apparatus or the like, and the heated core layer 11 and the resin composition are mixed to cover the surface of the core layer 11 with the above resin composition. In this way, the resin beads 10 having a multilayer structure and including the fusion-bonding layer 12 is obtained. Such a granulation method is preferable in that the fusion-bonding layer 12 is easily formed on the entire surface of the core layer 11.

(Dispersion Step)

Next, the dispersion step in the production method of the present invention will be described.

The dispersion step is a step of dispersing the resin beads 10 described above in an aqueous medium contained in the vessel. The above aqueous medium includes the inorganic dispersant. Further, the above aqueous medium may appropriately include an optional additive other than the inorganic dispersant.

Aqueous Medium:

The aqueous medium is a medium for dispersing the resin beads 10 in the vessel. Examples of the aqueous medium include water, alcohols, glycols, and glycerin, among which water is common. From a viewpoint of improving the dispersibility of the resin beads 10 and the productivity of the expanded beads 20, the amount of the resin beads 10 added to the aqueous medium is preferably 10 parts by weight or more and 100 parts by weight or less, and more preferably 20 parts by weight or more and 80 parts by weight or less with respect to 100 parts by weight of the aqueous medium.

Inorganic Dispersant:

The inorganic dispersant is used to efficiently disperse the resin beads 10 in the aqueous medium and to suppress the mutual blocking of the expanded beads 20 during the foaming step.

From a viewpoint of easily suppressing the mutual blocking of the expanded beads 20 while maintaining the in-mold molding property of the expanded beads 20, the amount of the inorganic dispersant added is preferably 0.01 parts by weight or more and 0.5 parts by weight or less, more preferably 0.03 parts by weight or more and 0.4 parts by weight or less, and still more preferably 0.05 parts by weight or more and 0.3 parts by weight or less with respect to 100 parts by weight of the aqueous medium.

As the inorganic dispersant, for example, inorganic fine particles such as aluminum oxide, tricalcium phosphate, magnesium pyrophosphate, zinc oxide, kaolin, and mica can be used. These inorganic fine particles may be used alone, or in combination of two or more kinds. Among them, the kaolin is preferably used because it is compatible with the NOR type hindered amine included in the fusion-bonding layer 12 and has an excellent effect of suppressing the blocking.

Optional Additives:

The aqueous medium may further include one or more optional additives such as a dispersion auxiliary agent and a surfactant in addition to the inorganic dispersant. Examples of the dispersion auxiliary agent include aluminum sulfate. Further, examples of the surfactant include anionic surfactants such as sodium alkylbenzene sulfonate, sodium dodecylbenzene sulfonate, and sodium alkanesulfonate. The surfactants may be used alone, or in combination of two or more kinds.

(Blowing Agent Impregnation Step)

Next, the blowing agent impregnation step will be described.

The blowing agent impregnation step is a step of impregnating the resin beads 10 dispersed in the aqueous medium with the blowing agent in the vessel to obtain expandable resin beads. The blowing agent impregnation step may be performed after the dispersion step described above, or a part of the step or the entire step may be performed in parallel with the dispersion step.

The blowing agent impregnation step is performed by appropriately selecting from a step of impregnating the resin beads with the blowing agent in a general method for producing the expanded beads. For example, a sealed vessel containing the resin beads 10 is sealed, and the blowing agent is added into the sealed vessel. In this way, the expandable resin beads can be obtained by impregnating the resin beads 10 in the blowing agent.

The physical blowing agent may be added into the sealed vessel at any timing before the resin beads are foamed. The blowing agent in a solid state may be added to the aqueous medium together with the resin beads 10 in the dispersion step, and then the resin beads 10 may be impregnated with the blowing agent in a gaseous state due to, for example, heating. Further, in parallel with the dispersion step or after the completion of the dispersion step, the blowing agent in a gaseous state may be injected into the sealed vessel to impregnate the resin beads 10 with the blowing agent. For example, in a case where carbon dioxide is used as the physical blowing agent, the blowing agent in a form of dry ice may be added to the aqueous medium together with the resin beads 10 during the dispersion step, or carbon dioxide in a gaseous state may be injected into the sealed container during the dispersion step or after completion of the dispersion step.

When the resin beads 10 is impregnated with the blowing agent, the impregnation of the resin beads 10 with the blowing agent can be promoted by heating and/or pressurizing the inside of the sealed vessel.

Further, in order to adjust a crystalline state of the expanded beads 20 to be obtained, in the dispersion step and/or the blowing agent impregnation step described above, for example, adjustment of the temperature rising rate of the sealed vessel or maintaining the sealed vessel at a predetermined temperature for a predetermined time period may be performed. For example, in the DSC curve obtained by heat-flux differential scanning calorimetry, it is possible to perform adjustment such that an endothermic peak (high-temperature peak) appears on a higher temperature side than an endothermic peak (intrinsic peak) of the main component of the base material resin constituting the main body of the expanded beads 20. The expanded beads 20 showing a high-temperature peak in this way is preferable from a viewpoint of a wider molding condition range in which a good expanded beads molded article can be obtained. The adjustment for obtaining the high-temperature peak described above is referred to, for example, in JP 4077745 A.

Note that the total heat of fusion in the expanded beads 20 to be obtained is preferably 40 J/g or more and 90 J/g or less, and more preferably 50 J/g or more and 80 J/g or less. Further, the endothermic quantity of the high-temperature peak (high-temperature peak heat of fusion) in the expanded beads 20 to be obtained is preferably 5 J/g or more and 50 J/g or less, more preferably 8 J/g or more and 40 J/g or less, and still more preferably 10 J/g or more and 30 J/g or less.

The total heat of fusion and the high-temperature peak heat of fusion in the expanded beads 20 are determined from the DSC curve to be obtained by heating 1 to 3 mg of the expanded beads as a test piece at a heating rate of 10° C./min from 23° C. to a temperature of 30° C. higher than the end of the melting peak of the test piece based on JIS K7122: 1987.

Blowing Agent:

The blowing agent used in the present invention is appropriately selected from blowing agents used for obtaining general expanded beads.

For example, a physical blowing agent is preferable as the blowing agent in the present invention. Specifically, as the physical blowing agent, an inorganic physical blowing agent and/or an organic physical blowing agent may be used. Examples of the inorganic physical blowing agent include carbon dioxide, air, nitrogen, helium, argon, and water. Examples of the organic physical blowing agent include aliphatic hydrocarbons such as propane, butane, and hexane, alicyclic hydrocarbons such as cyclopentane and cyclohexane, as well as halogenated hydrocarbons such as methyl chloride, ethyl chloride, methylene chloride, 2,3,3,3-tetrafluoropropene, trans-1,3,3,3-tetrafluoropropene, and trans-1-chloro-3,3,3-trifluoropropene.

These physical blowing agents may be used alone or two or more of them may be used in combination. Among these blowing agents, a blowing agent including, as a main component, the inorganic physical blowing agent such as carbon dioxide, nitrogen, or air is preferably used, and carbon dioxide is more preferably used. In the present invention, including, as a main component, the above inorganic physical blowing agent means that the physical blowing agent includes 50 mol % or more of the inorganic physical blowing agent. The physical blowing agent preferably includes the inorganic physical blowing agent in an amount of 70 mol % or more, more preferably 90 mol % or more, and the physical blowing agent further preferably includes merely the inorganic physical blowing agent.

The amount of the added physical blowing agent is appropriately determined according to, for example, the type of the base material resin constituting the resin beads 10, the type of the blowing agent, and the bulk density of the target expanded beads 20. In particular, the amount of the physical blowing agent added may be determined according to a desired bulk density. For example, in a case where carbon dioxide is used as the physical blowing agent, the amount of the carbon dioxide added is preferably 0.1 parts by weight or more and 30 parts by weight or less, more preferably 0.5 parts by weight or more and 15 parts by weight or less, and still more preferably 1 part by weight or more and 10 parts by weight or less with respect to 100 parts by weight of the resin beads 10.

(Foaming Step)

After the expandable resin beads are obtained by the blowing agent impregnation step described above, the foaming step is performed.

The foaming step is a step of releasing the resin beads 10 (expandable resin beads) including the blowing agent from the vessel together with the aqueous medium and foaming the resin beads to obtain the expanded beads 20. More specifically, the expandable resin beads are foamed by releasing the expandable resin beads together with the aqueous medium under a pressure lower than an internal pressure of the sealed vessel. Such foaming method is preferable for the reason that the expanded beads 20 having a low bulk density can be easily obtained.

However, when the foaming step described above is performed by using the resin beads having the fusion-bonding layer, conventionally, a blocking problem may occur for the reason that the expanded beads are easily bonded to each other. On the contrary, the production method of the present invention can sufficiently suppress the occurrence of blocking described above by using the resin beads 10 including the fusion-bonding layer 12 including the carbon black and the NOR type hindered amine in a predetermined range.

Bulk Density Adjustment:

The bulk density of the expanded beads 20 may be adjusted, for example, by appropriately changing the foaming conditions such as the temperature and the pressure in the sealed vessel when the contents of the sealed vessel are released in the foaming step.

Further, in a case where the expanded beads 20 having a lower bulk density are desired, a step of foaming the expanded beads in multiple stages as a two-stage foaming step described below may be performed. In the two-stage foaming step, first, the expanded beads 20 obtained as described above are stored in a pressurizable sealed vessel, and a pressure treatment is performed by injecting a gas such as air into the sealed vessel to increase the pressure in a cell of the expanded beads 20. Then, the two-stage foaming step is performed by taking out the expanded beads 20 from the sealed vessel, and heating the expanded beads by using steam or hot air to foam the expanded beads 20. Performing such two-stage foaming step can provide the expanded beads 20 (two-stage expanded beads) having a lower bulk density.

Further, it is easier to increase the cell diameter of the expanded beads 20 that are finally obtained through the two-stage foaming step for obtaining expanded beads 20 having a low bulk density as compared with a one-stage foaming step for obtaining the expanded beads 20 having a low bulk density. With the expanded beads molded article produced by using the expanded beads 20 obtained by performing the two-stage foaming step, the occurrence of unevenness in color tones can be more effectively suppressed.

Bulk Density of Expanded Beads:

The bulk density of the expanded beads 20 produced in the production method of the present invention is not particularly limited, and can be appropriately determined in consideration of the use of the expanded beads molded article formed by using the expanded beads. For example, from a viewpoint of achieving lightweight properties of the expanded beads molded article, the bulk density of the expanded beads 20 is preferably 500 kg/m$^3$ or less, more preferably 100 kg/m$^3$ or less, still more preferably 50 kg/m$^3$ or less, and particularly preferably 40 kg/m$^3$ or less.

From a viewpoint of further enhancing the rigidity of the expanded beads molded article, the bulk density of the expanded beads 20 is preferably 10 kg/m$^3$ or more, more preferably 15 kg/m$^3$ or more, and still more preferably 18 kg/m$^3$ or more.

For conventional expanded beads having a fusion-bonding layer, as the bulk density decreases (for example, the expanded beads having a bulk density of 100 kg/m$^3$ or less), the blocking problem is more likely to occur.

On the contrary, according to the production method of the present invention, it is possible to produce the expanded beads 20 having the fusion-bonding layer 22 and suppressing the blocking problem even when the expanded beads having a low bulk density is obtained. As a result, it is possible to provide an expanded beads molded article that is excellent in fusion-bonding characteristics and surface properties as well as light-weight.

Method for Measuring Bulk Density:

The bulk density of the expanded beads described above is measured in the following method. First, the expanded beads to be measured are left for 24 hours or more in an environment of an air temperature of 23° C., a relative humidity of 50%, and 1 atm. The expanded beads group thus obtained having a weight W (g) is filled in a measuring cylinder, and a bottom surface of the measuring cylinder is lightly tapped several times on a floor surface to stabilize a filling height of the expanded beads group in the measuring cylinder. A bulk volume V (L) of the expanded beads group indicated by a scale of the measuring cylinder is read, and a weight W of the expanded beads group is divided by the bulk volume V of the expanded beads group (W/V). By converting a value thus obtained into $kg/m^3$ through unit conversion, the bulk density ($kg/m^3$) of the expanded beads can be obtained.

[Polypropylene-Based Resin Expanded Beads]

Next, the polypropylene resin expanded beads of the present invention will be described. The method for producing the polypropylene resin expanded beads of the present invention is not limited, but the polypropylene resin expanded beads may be easily produced in the production method of the present invention described above. The polypropylene resin expanded beads of the present invention are the expanded beads 20 having a surface on which the fusion-bonding layer 22 is located, include the carbon black and the NOR type hindered amine, wherein a blending ratio of the carbon black in the fusion-bonding layer 22 is 0.5 wt % or more and 5 wt % or less, and a blending ratio of the hindered amine in the fusion-bonding layer is 0.03 wt % or more and 0.5 wt % or less. The expanded beads 20 shown in the lower part of FIG. 1 is interpreted as the polypropylene resin expanded beads of the present invention.

Since the expanded beads 20 of the present invention described above includes the fusion-bonding layer 22 including the carbon black and the NOR type hindered amine at a blending ratio in a predetermined range, the blocking problem and the accumulation problem of stains are efficiently suppressed. Therefore, the expanded beads 20 of the present invention is excellent in in-mold molding property, and the expanded beads molded article obtained through the in-mold molding by using the expanded beads 20 is excellent in fusion-bonding characteristics and surface properties.

Note that as the carbon black and the NOR type hindered amine blended in the fusion-bonding layer 22 in the expanded beads 20, the description of the carbon black and the NOR type hindered amine in the production method described above can be appropriately referred to.

Blending Ratio of Carbon Black in Fusion-Bonding Layer 22 of Expanded Beads 20:

From a viewpoint of easily suppressing the adhesion of the fusion-bonding layer 22 to the mold during the in-mold molding and easily providing the expanded beads molded article having a good appearance by suppressing the occurrence of unevenness in color tone, the blending ratio of the carbon black in the fusion-bonding layer 22 is preferably 1.0 wt % or more, more preferably 1.5 wt % or more, and still more preferably 2.0 wt % or more. However, from a viewpoint of enhancing the in-mold molding property of the expanded beads 20 and making the expanded beads molded article to be obtained less flammable, the blending ratio of the carbon black in the fusion-bonding layer 22 is preferably 4.0 wt % or less, more preferably 3.5 wt % or less, and still more preferably 3.0 wt % or less.

Blending Ratio of NOR Type Hindered Amine in Fusion-Bonding Layer 22 of Expanded Beads 20:

From a viewpoint of more efficiently suppressing the mutual blocking of the expanded beads 20 and making the expanded beads molded article to be obtained less flammable even when the carbon black is included, the blending ratio of the NOR type hindered amine in the fusion-bonding layer 22 is preferably 0.05 wt % or more, and more preferably 0.06 wt % or more. However, from a viewpoint of enhancing the in-mold molding property of the expanded beads 20, the blending ratio of the NOR type hindered amine in the fusion-bonding layer 22 is preferably 0.3 wt % or less, and more preferably 0.2 wt % or less.

Blending Ratio of Carbon Black in Expanded Beads 20:

From a viewpoint of imparting a good black appearance to the expanded beads molded article in-mold molded by using the expanded beads 20, the blending ratio of the carbon black in the expanded beads 20 is preferably 0.5 wt % or more, more preferably 1.0 wt % or more, still more preferably 1.5 wt % or more, and particularly preferably 2.0 wt % or more.

However, from a viewpoint that the flame retardancy of the expanded beads molded article in-mold molded by using the expanded beads 20 is not easily impaired, the blending ratio of the carbon black in the expanded beads 20 is preferably 5.0 wt % or less, more preferably 4.0 wt % or less, still more preferably 3.5 wt % or less, and particularly preferably 3.0 wt % or less.

Blending Ratio of NOR Type Hindered Amine in Expanded Beads 20:

From a viewpoint that the flame retardancy of the expanded beads molded article to be obtained is not impaired even when carbon black is included, the blending ratio of the NOR type hindered amine in the expanded beads 20 is preferably 0.03 wt % or more, more preferably 0.05 wt % or more, and still more preferably 0.06 wt % or more.

However, from a viewpoint of enhancing the appearance characteristics of the expanded beads molded article to be obtained, the blending ratio of the NOR type hindered amine in the expanded beads 20 is preferably 0.4 wt % or less, more preferably 0.3 wt % or less, and still more preferably 0.2 wt % or less.

The blending ratio of the carbon black in the fusion-bonding layer 22 of the expanded beads 20 is almost the same as the blending ratio of the carbon black in the fusion-bonding layer 12 of the resin beads 10 used for producing the expanded beads 20. Further, the blending ratio of the carbon black in the expanded beads 20 is almost the same as the blending ratio of the carbon black in the resin beads 10 used for producing the expanded beads 20. Therefore, the blending ratio of the carbon black in the fusion-bonding layer 22 or the expanded beads 20 can be appropriately calculated from materials used for producing the resin beads 10.

Note that the blending ratio of the carbon black in the fusion-bonding layer 22 or the expanded beads 20 may be directly measured from a test piece cut out from the fusion-bonding layer 22 or the expanded beads 20. As a measurement method, the test piece or the expanded beads 20 described above is subjected to measurement based on JIS K7120:1987 by using a thermogravimetric differential thermal analyzer (i.e., TG-DTA), and the blending ratio of the included carbon black can be determined based on a mass reduction rate from 400° C. to 1000° C. in a TG curve to be obtained.

The blending ratio of the NOR type hindered amine in the fusion-bonding layer 22 of the expanded beads 20 or the expanded beads 20 can be appropriately calculated, for example, from the blending ratio of each material used for producing the resin beads 10 used for producing the expanded beads 20.

Specifically, the blending ratio of the NOR type hindered amine in the fusion-bonding layer 22 of the expanded beads 20 can be calculated from the blending ratio of the NOR type hindered amine to the fusion-bonding layer 12 of the resin beads 10 in the production of the resin beads 10.

Further, the blending ratio of the NOR type hindered amine in the expanded beads 20 can be calculated from the relationship among the weight ratio of the core layer 11 of the resin beads 10 to the fusion-bonding layer 12 of the resin beads 10, the blending ratio of the NOR type hindered amine to the core layer 11 of the resin beads 10, and the blending ratio of the NOR type hindered amine to the fusion-bonding layer 12 of the resin beads 10 in the production of the resin beads 10.

Further, as another method, the blending ratio of the NOR type hindered amine in the fusion-bonding layer 22 or the expanded beads 20 may be directly measured from the test piece cut out from the fusion-bonding layer 22 or the expanded beads 20. The measurement method is not particularly limited, but for example, the blending ratio of the included NOR type hindered amine can be determined by subjecting the test piece or the expanded beads 20 described above to, for example, proton nuclear magnetic resonance ($^1$H-NMR).

Note that when the blending ratio of the NOR type hindered amine is determined by the proton nuclear magnetic resonance ($^1$H-NMR), for example, the following method can be adopted.

First, the above test piece or expanded beads frozen and pulverized is subjected to Soxhlet extraction by using chloroform as a solvent to remove polymer components or the like that are a chloroform insoluble part. Next, the chloroform soluble part obtained by the Soxhlet extraction is mixed with acetone to remove an acetone insoluble part. A solid obtained by removing the solvent from the acetone soluble part is used as a measurement sample, and measured by the proton nuclear magnetic resonance ($^1$H-NMR). From the relationship between this measurement result and a measurement result of a standard product (an internal standard sample) having a known concentration, the blending ratio of the NOR type hindered amine in the fusion-bonding layer 22 or the expanded beads 20 can be determined.

As an apparatus for performing the measurement by the proton nuclear magnetic resonance ($^1$H-NMR), for example, AL-400 model manufactured by JEOL Ltd. may be used. Further, measurement conditions of a solvent of $CDCl_3$ and an internal standard sample of tetrachloroethane (TCE) may be adopted.

Note that the fusion-bonding layer 22 present on the surface of the expanded beads 20 is a layer derived from the fusion-bonding layer 12 in the resin beads 10. The fusion-bonding layer 22 may be an expanded layer or an nonexpanded layer. Further, the fusion-bonding layer 22 may be partially foamed.

Further, the ratio of the fusion-bonding layer 22 in the expanded beads 20 is preferably 0.5 wt % or more and 10 wt % or less, more preferably 1 wt % or more and 8 wt % or less, and still more preferably 2 wt % or more and 6 wt % or less. Since the ratio of the weight of the fusion-bonding layer 22 to the total weight of the expanded beads 20 is within the above range, a molded article excellent in fusion-bonding characteristics can be obtained without impairing the physical properties, and the problems that are intended to be solved by the present invention can be solved.

Note that the ratio of the fusion-bonding layer 22 in the expanded beads 20 can be appropriately calculated from the blending ratio of each material used for producing the resin beads 10 used for producing the expanded beads 20.

The expanded beads 20 of the present invention may be produced in the production method of the present invention described above. Therefore, the above description regarding the production method of the present invention is appropriately referred to as the description of the expanded beads 20 of the present invention.

[Expanded Beads Molded Article]

The expanded beads molded article may be obtained by performing the in-mold molding through using the expanded beads 20 of the present invention. For example, the expanded beads molded article is produced as follows. First, the expanded beads 20 is filled in a mold that has a cavity corresponding to a desired shape of the expanded beads molded article, and the expanded beads 20 filled in the mold is heated by a heating medium such as steam. The expanded beads 20 in the cavity is softened by heating and fused to each other. In this way, the expanded beads 20 is integrated with each other, and the expanded beads molded article corresponding to a shape of the cavity is obtained.

The expanded beads molded article produced by using the expanded beads 20 receives the effects of the present invention, and is excellent in fusion-bonding characteristics and surface characteristics, and the apparent density can be adjusted to an appropriate range. Therefore, the expanded beads molded article may be suitably used for various applications such as packaging materials, automobile members, and building materials.

Apparent Density:

The apparent density of the expanded beads molded article to be obtained by using the expanded beads 20 is not particularly limited, but is preferably 10 kg/m$^3$ or more and 500 kg/m$^3$ or less, and more preferably 15 kg/m$^3$ or more and 100 kg/m$^3$ or less from a viewpoint of excellent balance between the lightweight properties and mechanical properties such as rigidity. The apparent density of the expanded beads molded article is calculated by dividing the weight of the expanded beads molded article by the volume calculated based on dimensions.

EXAMPLES

Hereinafter, the present invention will be described in detail with reference to examples, but the present invention is not limited thereto. Note that for each example and each comparative example implemented as follows, the bulk density or the like of the expanded beads were measured, and the productivity evaluation during the in-mold molding and evaluation of the molded article of polypropylene-based resin expanded beads produced by using the expanded beads were performed. The measurement results and an evaluation results are shown in Table 1 and Table 2. Further, a method for measuring the above bulk density or the like, and a method for performing the above evaluation will be described later. In the tables, the carbon black is described as CB.

Further, the blending ratio of the NOR type hindered amine in the fusion-bonding layer of the expanded beads, and the blending ratio of the carbon black in the fusion-bonding layer of the expanded beads were calculated from the blending ratio of each material used for producing the resin beads and shown in the tables. Note that the blending ratio of the NOR type hindered amine in the expanded beads and the blending ratio of the carbon black in the expanded beads are also appropriately calculated from the blending ratio of each material used for producing the resin beads.

Example 1

(Preparation of Resin Beads)

A production apparatus equipped with a core layer forming extruder having an inner diameter of 50 mm, a die for forming a multilayer strand attached to the downstream side of the core layer forming extruder, and a covering layer forming extruder having an inner diameter of 30 mm was prepared. Note that in the production apparatus, the downstream side of the covering layer forming extruder is connected to the die for forming the multilayer strand, and the melt-kneaded product for forming each layer can be laminated in the die and co-extrusion can be performed.

As a base material resin constituting the core layer, a propylene-ethylene random copolymer was used. As the above propylene-ethylene random copolymer, a polypropylene-based resin having a melting point (a melting peak temperature) of 143° C. measured based on JIS K7121:1987 and a melt mass flow rate of 8 g/10 min measured under conditions of 230° C. and a load of 2.16 kg based on JIS K7210-1:2014 was used. As a core layer molding material constituting the core layer, in addition to the base material resin described above, 0.1 parts by weight of zinc borate as a cell controlling agent was used with respect to 100 parts by weight of the core layer molding material, and carbon black (furnace black) and NOR type hindered amine (manufactured by BASF SE, trade name NOR116 (with a molecular weight of 2261)) were used at a blending ratio shown in Table 1, and these materials were supplied to the core layer forming extruder and melt-kneaded.

As a base material resin constituting the fusion-bonding layer, a propylene-ethylene-butene random copolymer was used. As the above propylene-ethylene-butene random copolymer, a polypropylene-based resin having a melting point (a melting peak temperature) of 133° C. measured based on JIS K7121:1987 and a melt mass flow rate of 6 g/10 min obtained under conditions of 230° C. and a load of 2.16 kg based on JIS K7210-1:2014 was used. As a fusion-bonding layer forming material constituting the fusion-bonding layer, in addition to the above base material resin, the carbon black (the furnace black) and the NOR type hindered amine (manufactured by BASF SE, trade name NOR116 (with a molecular weight of 2261)) were used at a blending ratio shown in Table 1, and these materials were supplied to the covering layer forming extruder and melt-kneaded.

The melt-kneaded product for forming each layer, which is obtained through melt-kneading as described above, was introduced into the die for forming the multilayer strand and merged in the die, and the multilayer strand having a two-layer structure (fusion-bonding layer/core layer structure) was extruded from pores of a spinneret attached to the downstream side of the die. The extruded strand was cooled with water and cut with a pelletizer to obtain resin beads having an average weight of 1.0 mg.

(Preparation of Expanded Beads)

The obtained resin beads of 1 kg was supplied into a sealed vessel having a content of 5 L together with 3 L of water as an aqueous dispersion medium. Further, with respect to 100 parts by weight of the resin beads, 0.3 parts by weight of kaolin as an inorganic dispersant and 0.004 parts (as an active ingredient) by weight of a surfactant (trade name NEOGEN, manufactured by DKS Co., Ltd., sodium dodecylbenzenesulfonate) were both added to the sealed vessel.

Next, carbon dioxide as a blowing agent was injected into the sealed vessel and pressurized until a gauge pressure reached 2.0 MPa (G). Note that the pressure denoted by (G) is a gauge pressure, that is, a value of a pressure based on the atmospheric pressure. Then, the inside of the sealed vessel was heated to a foaming temperature (149.5° C.) at a heating rate of 2° C./min with stirring, and maintained at the same temperature for 15 minutes. In this way, adjustment was performed such that a high-temperature peak appeared in an endothermic curve of the expanded beads to be obtained according to DSC measurement.

Then, the contents (the resin beads and water) in the sealed vessel were released under the atmospheric pressure to obtain expanded beads (first-stage expanded beads) having a bulk density of 60 kg/m$^3$. Note that the same step as the step described above was repeated several cycles to secure the expanded beads to be subjected to evaluation to be described later.

The first-stage expanded beads obtained as described above were left in an environment of an air temperature of 23° C., a relative humidity of 50%, and 1 atm for 24 hours to be aged. Then, the pressurizable sealed vessel was filled with the first-stage expanded beads after having been aged, and the pressure in the sealed vessel was increased from a normal pressure to pressurize the expanded beads. The state where the expanded beads were pressurized was maintained for a predetermined time period, and cells of the expanded beads were impregnated with air. Then, the first-stage expanded beads were taken out from the sealed vessel to obtain first-stage expanded beads having a pressure in the cell of the expanded beads of 0.5 MPa (G). Then, this first-stage expanded beads were supplied to a second-stage foaming apparatus. Steam was supplied into the apparatus to foam the first-stage expanded beads, thereby obtaining expanded beads having a bulk density of 27 kg/m$^3$. The expanded beads obtained by the second-stage foaming were used in, for example, the following measurement and the production of the expanded beads molded article.

(Bulk Density of Expanded Beads)

The expanded beads to be measured are left for 24 hours or more in an environment of an air temperature of 23° C., a relative humidity of 50%, and 1 atm to be aged. The expanded beads group (with a weight W of 30 g) after having been aged was filled in a measuring cylinder, and the bottom surface of the measuring cylinder was lightly tapped several times on a floor surface to stabilize the filling height of the expanded beads group in the measuring cylinder. The bulk volume V (L) of the expanded beads group indicated by the scale of the measuring cylinder was read. Then, the weight W of the above expanded beads group was divided by the bulk volume V (W/V). By converting the value thus obtained into kg/m$^3$ through unit conversion, the bulk density (kg/m$^3$) of the expanded beads was calculated.

(Total Heat of Fusion and High-Temperature Peak Heat of Fusion of Expanded Beads)

About 2 mg of the expanded beads was used as a test piece. The test piece was heated and melted according to a plastic transition heat measurement method described in JIS K7122:1987 to obtain a DSC curve at this time. The measurement temperature range was from 23° C. to a temperature of 30° C. higher than the end of the melting peak of the test piece, and the heating rate during heating was 10° C./min.

The DSC curve thus obtained is illustrated in FIG. 2. In the DSC curve, a straight line connecting a point I corresponding to 80° C. on the DSC curve and a point II corresponding to a melting end temperature of the expanded beads was drawn. Note that the melting end temperature is an end point on the high temperature side of a high-temperature peak b, and is an intersection of the high-temperature peak b and a baseline on the higher temperature side than the high-temperature peak b in the DSC curve.

As illustrated in FIG. 2, after a straight line connecting the point I and the point II was drawn, an intersection of a straight line passing through a maximum point III existing between an intrinsic peak a and the high-temperature peak b and parallel to the vertical axis of the graph, and a straight line connecting the point I and the point II was defined as IV.

Then, the area surrounded by a straight line connecting the point I and the point IV, a straight line connecting the point III and the point IV, and a DSC curve connecting the point I and the point III was defined as the area of the intrinsic peak a. Further, the area of a portion (hatched portion) surrounded by a straight line connecting the point IV and the point II, a straight line connecting the point III and the point IV, and a DSC curve connecting the point III and the point II was defined as the area of the high-temperature peak b. The total heat of fusion of the expanded beads was calculated from a sum of the area of the intrinsic peak a and the area of the high-temperature peak b obtained as described above, and the high-temperature peak heat of fusion of the expanded beads was calculated from the area of the high-temperature peak b.

(Production of Expanded Beads Molded Article)

The obtained expanded beads were filled in a pressurizable sealed vessel, and the pressure in the sealed vessel was increased from a normal pressure to pressurize the expanded beads. The state where the expanded beads were pressurized was maintained for a predetermined time period, and cells of the expanded beads were impregnated with air. Then, the expanded beads were taken out from the sealed vessel to obtain expanded beads having a pressure in the cells of the expanded beads of 0.1 MPa (G). These expanded beads were filled in a mold having a molding cavity capable of molding a box-shaped molded article having dimensions of length 200 mm×width 150 mm×height 50 mm and a bottom wall and a side wall of 10 mm in thickness, and heated in the following heating method. In the heating method, steam was supplied to a mold to perform preheating (exhaust step) in a state where drain valves provided on both surfaces of the mold were opened. Then, steam was supplied from one side of the mold for heating, and steam was further supplied from the other side of the mold for heating. Subsequently, steam was supplied from both sides of the mold at a steam pressure for molding and heating of 0.26 MPa (G) for heating. After completion of the heating, the pressure was released, and the expanded beads molded article was cooled with water until the pressure generated on the molding surface of the mold reached 0.04 MPa (G), and then taken out by opening the mold. The obtained expanded beads molded article was aged in an oven at 80° C. for 12 hours, and then slowly cooled to a room temperature to obtain a box-shaped expanded beads molded article with the upper part opened. The expanded beads molded article is an upward opened box having outer dimensions of length 200 mm×width 150 mm×height 50 mm and a bottom wall and a side wall both having a thickness of 10 mm, and has a shape in which an upper surface side is opened when a surface of length 200 mm×width 150 mm is defined as a lower surface.

Example 2

The resin beads were prepared by the same operation as in Example 1 except that the blending ratio of the NOR type hindered amine added to the fuse-bond layer forming material was changed to a numerical value shown in Table 1. The resin beads were used to obtain the expanded beads and the expanded beads molded article in the same method as in Example 1.

Example 3

The resin beads were prepared by the same operation as in Example 1 except that the blending ratios of the NOR type hindered amine and the carbon black added to the fusion-bonding layer forming material was changed to a numerical value shown in Table 1. The resin beads were used to obtain the expanded beads and the expanded beads molded article in the same method as in Example 1.

Examples 4 and 5

The resin beads were prepared by the same operation as in Example 1 except that a type of the NOR type hindered amine added to a core layer forming material and the fusion-bonding layer forming material was changed. The resin beads were used to obtain the expanded beads and the expanded beads molded article in the same method as in Example 1.

Note that as the NOR type hindered amine, "FP-T80 (trade name, with a molecular weight of 681) manufactured by ADEKA Corporation" was used in Example 4, and "Tinuvin123 (trade name, with a molecular weight of 737) manufactured by BASF SE" was used in Example 5.

Example 6

The expanded beads (first-stage expanded beads) were obtained in the same manner as in Example 1. Such expanded beads were used, and two-stage foaming was performed in the same procedure as in Example 1 to have the bulk density shown in Table 1 to prepare the expanded beads having an expansion ratio different from that of Example 1. The expanded beads were used to obtain the expanded beads molded article by the same method as in Example 1.

In any of the examples, the expanded beads molded article excellent in surface properties was produced without causing the blocking problem and the accumulation problem of stains. Further, in Examples 4 and 5 in which the NOR type hindered amine having a smaller molecular weight was used, the expanded beads molded article was produced in which color tone unevenness was efficiently suppressed and which had a particularly excellent appearance.

Comparative Example 1

The resin beads were prepared by the same operation as in Example 1 except that the NOR type hindered amine and the carbon black were not added to the fusion-bonding layer forming material. The resin beads were used to obtain the expanded beads and the expanded beads molded article in the same method as in Example 1.

Since the fusion-bonding layer in the resin beads prepared in Comparative Example 1 was not added with the NOR type hindered amine and the carbon black, the mutual blocking of the expanded beads occurred when the foaming step was performed using the resin beads. Further, when the expanded beads prepared in Comparative Example 1 were used and repeatedly in-mold molded in the same mold, a part of the fusion-bonding layer was adhered and accumulated on an inner surface of the mold. As a result, the surface properties of the obtained expanded beads molded article were impaired.

Comparative Example 2

The resin beads were prepared in the same operation as in Example 1 except that the NOR type hindered amine was not added to the fusion-bonding layer forming material and the blending ratio of the carbon black was 4 wt %. The resin beads were used to obtain the expanded beads and the expanded beads molded article in the same method as in Example 1.

Since the fusion-bonding layer in the resin beads prepared in Comparative Example 2 was not added with the NOR type hindered amine, the mutual blocking of the expanded beads occurred when the foaming step was performed using the resin beads. Further, when the expanded beads prepared in Comparative Example 2 were used and repeatedly in-mold molded in the same mold, a part of the fusion-bonding layer was adhered and accumulated on the inner surface of the mold. As a result, the surface properties of the obtained expanded beads molded article were impaired.

Comparative Example 3

The resin beads were prepared in the same operation as in Example 1 except that the carbon black was not added to the fusion-bonding layer forming material. The resin beads were used to obtain the expanded beads and the expanded beads molded article in the same method as in Example 1.

Since the fusion-bonding layer in the resin beads adjusted in Comparative Example 3 was not added with the carbon black, a part of the fusion-bonding layer was adhered to and accumulated on the inner surface of the mold when the expanded beads prepared by using the fusion-bonding layer were used and repeatedly in-mold molded in the same mold. As a result, the surface properties of the obtained expanded beads molded article were impaired.

Comparative Example 4

The resin beads were prepared by the same operation as in Example 1 except that the blending ratio of the NOR type hindered amine to the fusion-bonding layer forming material was changed to a numerical value shown in Table 2. The resin beads were used to obtain the expanded beads and the expanded beads molded article in the same method as in Example 1.

The fusion-bonding layer in the resin beads adjusted in Comparative Example 4 exceeded the range of the blending ratio of the NOR type hindered amine specified in the present invention. Therefore, the expanded beads molded article obtained by performing in-mold molding that uses expanded beads prepared by using the fusion-bonding layer was poor in fusion-bonding characteristics.

Comparative Examples 5 and 6

The resin beads were prepared by the same operation as in Example 1 except that a hindered amine other than the NOR type hindered amine was added to the fusion-bonding layer forming material. The resin beads were used to obtain the expanded beads and the expanded beads molded article in the same method as in Example 1. Note that in Comparative Example 5, "Tinuvin622, which is a trade name, manufactured by BASF SE" was used as an NR type hindered amine, and in Comparative Example 6, "Tinuvin770, which is a trade name, manufactured by BASF SE" was used as an NH type hindered amine.

The fusion-bonding layer in the resin beads adjusted in Comparative Examples 5 and 6 does not include the NOR type hindered amine but include a hindered amine other than the NOR type hindered amine. Therefore, when the expanded beads prepared by using the fusion-bonding layer were used and repeatedly in-mold molded in the same mold, a part of the fusion-bonding layer was adhered and accumulated on the inner surface of the mold. As a result, the surface properties of the obtained expanded beads molded article were impaired.

<Evaluation of Productivity>

Presence or Absence of Blocking During Foaming Step:

The expanded beads were sieved with a punching screen having a diameter of 6 mm, a pitch of 8 mm, and an opening ratio of 35%, and the weight of the expanded beads remaining on the screen was measured. The ratio of the weight of the expanded beads remaining on the screen to the weight of all the expanded beads sieved was calculated and evaluated in accordance with the following criteria.

Absence: the ratio of the weight of the expanded beads remaining on the screen was less than 5 wt %.

Presence: the ratio of the weight of the expanded beads remaining on the screen was 5 wt % or more.

Presence or absence of resin adhesion to mold when in-mold molding is repeatedly performed:

The in-mold molding for 30 cycles was continuously performed with the same mold and under the same molding conditions. Whether or not the resin adhered to the mold after completion of the molding was visually observed and evaluated in accordance with the following criteria.

○ (Good): No adhesion was observed.

x (Bad): Partial adhesion was observed.

<Evaluation of Molded Article>

Apparent Density of Expanded Beads Molded Article:

A value obtained by dividing the weight of the expanded beads molded article by the volume calculated based on the dimensions was defined as the apparent density ($kg/m^3$) of the expanded beads molded article.

Fusion-Bonding Characteristics:

The fusion-bonding characteristics of the expanded beads molded article was determined based on the ratio of the number of the expanded beads of which the material was broken among the expanded beads exposed on a fracture surface when the expanded beads molded article was broken. Specifically, first, a test piece (length 100 mm×width 100 mm×thickness: the thickness of the molded article) was cut out from the expanded beads molded article, a cut of about 5 mm was made in a thickness direction of each test piece with a cutter knife, and then the test piece was fractured from the cut portion. Next, a number (n) of the expanded beads present on the fracture surface of the expanded beads molded article and a number (b) of the expanded beads of which the material was broken were measured, and a ratio (b/n) of (b) to (n) was expressed as a percentage to be a fusion-bonding ratio (%) and evaluated as follows.

○ (Good): The fusion-bonding ratio is 80% or more.

Δ (Normal): The fusion-bonding ratio is less than 80% and 40% or more.

x (Bad): The fusion-bonding ratio is less than 40%.

Surface Properties:

The in-mold molding was continuously performed for 30 cycles. Whether or not an unintended recess in design (a recess considered to be caused by an influence of stains of the mold) and a gap between the expanded beads were observed on the surface of the expanded beads molded article obtained at the 30th cycle was visually observed and evaluated in accordance with the following criteria.

○ (Good): Gaps and/or recesses are hardly observed on the surface of the expanded beads molded article.

x (Bad): Gaps and/or recesses are observed here and there on the surface of the expanded beads molded article.

Note that in the above x (Bad) evaluation, the above recesses and gaps were mainly formed in a bottom wall portion of the box-shaped expanded beads molded article.

Unevenness of Color Tone (Appearance):

A surface of the box-shaped expanded beads molded article of length 200 mm×width 150 mm was defined as a lower surface, and 30 measurement positions were randomly set from a lateral side surface when the box-shaped expanded beads molded article was arranged such that the opening portion becomes the upper surface. The color tone at these measurement positions was measured by using a spectrophotometer ("CM-5", manufactured by Konica Minolta Japan, Inc.) to acquire a color coordinate in the CIE 1976 L*a*b* color space. Note that the color tone was acquired by reflection measurement, a measurement diameter was 8 mm in diameter, and the measurement method was an SCE method. The difference between the maximum value and the minimum value of the L* value in the color coordinate obtained at the 30 measurement positions described before was evaluated in accordance with the following criteria.

⊙ (Very Good): The difference between the maximum value and the minimum value of the L* value is less than 5.

○ (Normal): The difference between the maximum value and the minimum value of the L* value is 5 or more.

Note that the L* value is an index of brightness, indicating that as the value increases, the brightness increases. It means that as the difference between the maximum value and the minimum value of the L* value decreases, a difference in brightness decreases, and so does a difference in color unevenness.

Further, since all of the expanded beads molded articles in respective comparative examples were poor in either of fusion-bonding characteristics or surface properties, the unevenness of color tone was not evaluated.

TABLE 1

| | | | | Example 1 | Example 2 | Example 3 | Example 4 | Example 5 | Example 6 |
|---|---|---|---|---|---|---|---|---|---|
| Resin beads | Core layer | Hindered amine | Type | NOR116 NOR type | NOR116 NOR type | NOR116 NOR type | FP-T80 NOR type | Tinuvin123 NOR type | NOR116 NOR type |
| | | | Blending ratio (wt %) | 0.1 | 0.1 | 0.1 | 0.1 | 0.1 | 0.1 |
| | | CB | Blending ratio (wt %) | 2.7 | 2.7 | 2.7 | 2.7 | 2.7 | 2.7 |
| | Fusion-bonding layer | Hindered amine | Type | NOR116 NOR type | NOR116 NOR type | NOR116 NOR type | FP-T80 NOR type | Tinuvin123 NOR type | NOR116 NOR type |
| | | | Blending ratio (wt %) | 0.1 | 0.2 | 0.2 | 0.1 | 0.1 | 0.1 |
| | | CB | Blending ratio (wt %) | 2.7 | 2.7 | 4 | 2.7 | 2.7 | 2.7 |
| | | Hindered amine (wt %)/CB (wt %) | | 0.037 | 0.074 | 0.050 | 0.037 | 0.037 | 0.037 |
| | | Core layer (wt %)/Fusion-bonding layer (wt %) | | 96/5 | 96/5 | 96/5 | 96/5 | 96/5 | 96/5 |
| Expanded beads | Bulk density (kg/m³) | | | 27 | 27 | 27 | 27 | 27 | 18 |
| | Total heat of fusion (J/g) | | | 75 | 75 | 75 | 75 | 75 | 75 |
| | High-temperature peak heat of fusion (J/g) | | | 15 | 15 | 15 | 15 | 15 | 15 |
| | Blending ratio of hindered amine in fusion-bonding layer (wt %) | | | 0.10 | 0.20 | 0.20 | 0.10 | 0.10 | 0.10 |
| | Blending ratio of CB in fusion-bonding layer (wt %) | | | 2.7 | 2.7 | 4 | 2.7 | 2.7 | 2.7 |
| Evaluation of productivity | Presence or absence of blocking during foaming step | | | Absence | Absence | Absence | Absence | Absence | Absence |
| | Presence or absence of resin adhesion to mold | | | Absence | Absence | Absence | Absence | Absence | Absence |
| Evaluation of molded article | Apparent density (kg/m³) | | | 30 | 30 | 30 | 30 | 30 | 20 |
| | Fusion-bonding characteristics | | | ○ | ○ | ○ | ○ | ○ | ○ |
| | Surface properties | | | ○ | ○ | ○ | ○ | ○ | ○ |
| | Unevenness of color tone (appearance) | | | ○ | ○ | ○ | ⊙ | ⊙ | ○ |

TABLE 2

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| Resin beads | Core layer | Hindered amine | Type | NOR116 NOR type | NOR116 NOR type | NOR116 NOR type | NOR116 NOR type | NOR116 NOR type | NOR116 NOR type |
| | | | Blending ratio (wt %) | 0.1 | 0.1 | 0.1 | 0.1 | 0.1 | 0.1 |
| | | CB | Blending ratio (wt %) | 2.7 | 2.7 | 2.7 | 2.7 | 2.7 | 2.7 |
| | Fusion-bonding layer | Hindered amine | Type | — | — | NOR116 NOR type | NOR116 NOR type | Tinuvin622 NR type | Tinuvin770 NH type |
| | | | Blending ratio (wt %) | 0 | 0 | 0.1 | 1 | 0.1 | 0.1 |
| | | CB | Blending ratio (wt %) | 0 | 4 | 0 | 2.7 | 2.7 | 2.7 |
| | | Hindered amine (wt %)/CB (wt %) | | — | 0 | — | 0.37 | 0.037 | 0.037 |
| | | Core layer (wt %)/Fusion-bonding layer (wt %) | | 96/5 | 96/5 | 96/5 | 96/5 | 96/5 | 96/5 |

TABLE 2-continued

|  |  | Comparative Example 1 | Comparative Example 2 | Comparative Example 3 | Comparative Example 4 | Comparative Example 5 | Comparative Example 6 |
|---|---|---|---|---|---|---|---|
| Expanded beads | Bulk density (kg/m$^3$) | 27 | 27 | 27 | 27 | 27 | 27 |
|  | Total heat of fusion (J/g) | 75 | 75 | 75 | 75 | 75 | 75 |
|  | High-temperature peak heat of fusion (J/g) | 15 | 15 | 15 | 15 | 15 | 15 |
|  | Blending ratio of hindered amine in fusion-bonding layer (wt %) | 0.00 | 0.00 | 0.10 | 1.0 | 0.10 | 0.10 |
|  | Blending ratio of CB in fusion-bonding layer (wt %) | — | 4 | — | 2.7 | 2.7 | 2.7 |
| Evaluation of productivity | Presence or absence of blocking during foaming step | Presence | Presence | Absence | Absence | Absence | Absence |
|  | Presence or absence of resin adhesion to mold | Presence | Presence | Presence | Absence | Presence | Presence |
| Evaluation of molded article | Apparent density (kg/m$^3$) | 30 | 30 | 30 | 30 | 30 | 30 |
|  | Fusion-bonding characteristics | ○ | ○ | ○ | x | ○ | ○ |
|  | Surface properties | x | x | x | ○ | x | x |
|  | Unevenness of color tone (appearance) | n.t. | n.t. | n.t. | n.t. | n.t. | n.t. |

The above embodiment includes the following technical ideas.

(1) A method for producing polypropylene-based resin expanded beads including:
a dispersion step of dispersing the polypropylene-based resin beads in an aqueous medium including an inorganic dispersant in a vessel;
a blowing agent impregnation step of impregnating the polypropylene-based resin beads with a blowing agent in the vessel; and
a foaming step of releasing the polypropylene-based resin beads including the blowing agent from the vessel together with the aqueous medium to foam the polypropylene-based resin beads, wherein
the polypropylene-based resin beads include a core layer having a polypropylene-based resin as a base material resin and a fusion-bonding layer covering the core layer,
the fusion-bonding layer of the polypropylene-based resin beads include carbon black and an NOR type hindered amine,
a blending ratio of the carbon black in the fusion-bonding layer of the polypropylene-based resin beads is 0.5 wt % or more and 5 wt % or less, and
a blending ratio of the NOR type hindered amine in the fusion-bonding layer of the polypropylene-based resin beads is 0.03 wt % or more and 0.5 wt % or less.

(2) The method for producing polypropylene-based resin expanded beads according to the above (1), wherein a ratio of the blending ratio (wt %) of the NOR type hindered amine to the blending ratio (wt %) of the carbon black in the fusion-bonding layer of the polypropylene-based resin beads is 0.01 or more and 0.1 or less.

(3) The method for producing polypropylene-based resin expanded beads according to the above (1) or (2), wherein a ratio of the fusion-bonding layer in the polypropylene-based resin beads is 0.5 wt % or more and 10 wt % or less.

(4) The method for producing polypropylene-based resin expanded beads according to any one of the above (1) to (3), wherein the polypropylene-based resin expanded beads has a bulk density of 10 kg/m$^3$ or more and 500 kg/m$^3$ or less.

(5) Polypropylene-based resin expanded beads having a surface on which a fusion-bonding layer is located, wherein the fusion-bonding layer includes carbon black and an NOR type hindered amine,
a blending ratio of the carbon black in the fusion-bonding layer is 0.5 wt % or more and 5 wt % or less, and
a blending ratio of the hindered amine in the fusion-bonding layer is 0.03 wt % or more and 0.5 wt % or less.

REFERENCE SIGNS LIST

10 Polypropylene-based resin beads
11 Core layer
12 Fusion-bonding layer
20 Polypropylene-based resin expanded beads
22 Fusion-bonding layer

The invention claimed is:

1. A method for suppressing blocking of expanded beads to each other in a foaming step and accumulation of stains derived from the expanded beads to a mold during in-mold molding as a result of producing polypropylene-based resin expanded beads, the method comprising:
a dispersion step of dispersing polypropylene-based resin beads in an aqueous medium including an inorganic dispersant in a vessel;
a blowing agent impregnation step of impregnating the polypropylene-based resin beads with a blowing agent in the vessel; and
a foaming step of releasing the polypropylene-based resin beads including the blowing agent from the vessel together with the aqueous medium to foam the polypropylene-based resin beads, wherein
the polypropylene-based resin beads include a core layer having a polypropylene-based resin as a base material resin, and a fusion-bonding layer having a polyolefin-based resin as a base material resin covering the core layer, wherein
the polyolefin-based resin, if a polypropylene-based resin, is not the same as the polypropylene-based resin of the core layer,
the polyolefin-based resin shows a melting point or a softening point lower than a melting point of the polypropylene-based resin of the core layer,
a ratio of the fusion-bonding layer in the polypropylene-based resin beads is 0.5 wt % or more and 10 wt % or less,
the fusion-bonding layer of the polypropylene-based resin beads includes carbon black and an NOR type hindered amine,
a blending ratio of the carbon black in the fusion-bonding layer of the polypropylene-based resin beads is 0.5 wt % or more and 5 wt % or less,
a blending ratio of the NOR type hindered amine in the fusion-bonding layer of the polypropylene-based resin beads is 0.03 wt % or more and 0.5 wt % or less, and
the NOR type hindered amine is one or more selected from compounds represented by the following chemical formulae (2) to (4):

[Chemical Formula 2]

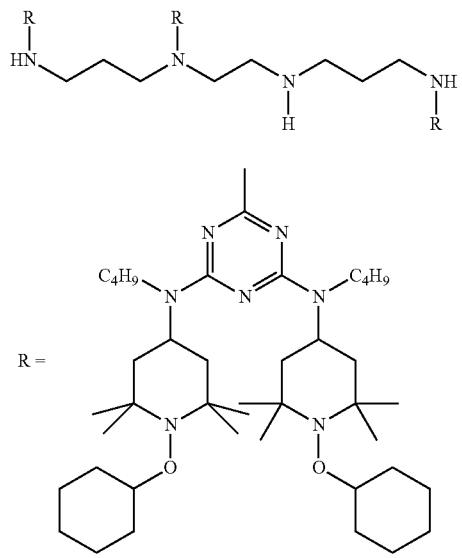

(2)

[Chemical Formula 3]

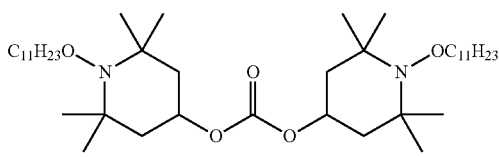

(3)

[Chemical Formula 4]

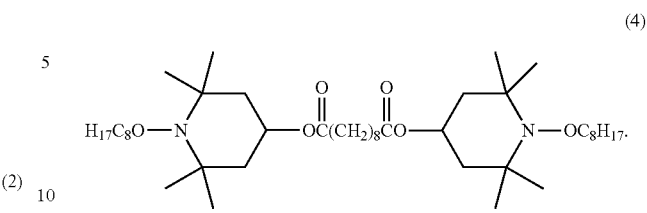

(4)

2. The method for producing polypropylene-based resin expanded beads according to claim 1, wherein the melting point of the polyolefin-based resin is 100° C. or higher and 150° C. or lower.

3. The method for producing polypropylene-based resin expanded beads according to claim 1, wherein a difference between the melting point of the polypropylene-based resin of the core layer and the melting point of the polyolefin-based resin is 3° C. or higher and 30° C. or lower.

4. The method for producing polypropylene-based resin expanded beads according to claim 1, wherein a ratio of the blending ratio (wt %) of the NOR type hindered amine to the blending ratio (wt %) of the carbon black in the fusion-bonding layer of the polypropylene-based resin beads is 0.01 or more and 0.1 or less.

5. The method for producing polypropylene-based resin expanded beads according to claim 1, wherein the polypropylene-based resin expanded beads have a bulk density of 10 kg/m³ or more and 500 kg/m³ or less.

6. Polypropylene-based resin expanded beads having a surface on which a fusion-bonding layer is located, obtained by the method according to claim 1.

* * * * *